Aug. 28, 1962        M. O. BABB        3,051,398
APPARATUS FOR PREPARING BALED INSULATION
MATERIAL FOR GAS ENTRAINMENT
Filed April 14, 1959

INVENTOR.
MARVIN O. BABB
BY White and Haefliger
ATTORNEYS.

3,051,398
APPARATUS FOR PREPARING BALED INSULATION MATERIAL FOR GAS ENTRAINMENT
Marvin O. Babb, 1807 E. 7th St., Los Angeles, Calif.
Filed Apr. 14, 1959, Ser. No. 806,365
2 Claims. (Cl. 241—136)

This invention relates generally to the handling and processing of insulation material such as rock wool and glass fibers, and more particularly concerns a method for processing fibrous insulation material and in bulk form to render it adaptable for gas stream entrainment. This application is a continuation-in-part of my co-pending application entitled Apparatus and Method for Blowing Baled Insulation Material, Serial No. 751,326, filed July 28, 1958 issued on June 20, 1961 as Patent 2,989,252.

Speaking with reference to known methods for introducing insulation material in a stream of air to be conveyed by the air stream to the point or location, for example in an attic, where the insulation material is to be deposited, it is customary to supply pre-shredded insulation material to the site of an insulation job in containers or bags weighing around twenty-seven pounds. The bagged material is then emptied into a machine which feeds it to the air stream passing through a conduit to the location of insulation deposition. This method of handling the material is wasteful in that it requires the use of many bags or sacks, which in the aggregate are costly, and which must be excessively handled and processed as by filling them with the pre-shredded insulation material at the factory and emptying them at the job site, which requires the full time of an operator.

The present invention has for one of its major objects to eliminate handling of such bagged insulation material through the provision of apparatus for processing fibrous insulation material in bulk or unshredded form, making it suitable for gas stream entrainment at the site of a particular insulation job. It is contemplated that the insulation material be delivered from the warehouse or the factory to the job site in bulk form, for example in bales weighing around seventy-five pounds which may very easily be rolled and tied with twisted paper cord at the factory, with the consequent advantage that the use of bags for shipping shredded insulation material is eliminated.

Accordingly, in its broad concept, the invention is directed to the provision of a hopper for receiving a bulky body or bale of fibrous insulation material so that the body is adapted to advance from the hopper, spaced cutters in the path of advancement of the bulky body that are operable to cut grooves or furrows in and form into segments the forward end portions of the body or bale as it advances against the cutter, and means within which the resultant cut material is confined and from which it may flow for subsequent entrainment by the gas stream. More specifically, the apparatus is constructed to include rotary cutters spaced at intervals across the path of advancement of the bulky body or bale of insulation material, together with rotary means for severing or knocking loose the material cut into segments at the forward end of the bulky body, the rotary severing means preferably comprising impactors or knockers spaced between the rotary cutters and having shoulders extending in radial planes and openly facing in the direction of rotation of the impactors for sweeping the severed material out of and away from the cutting zone. The rotary cutters preferably project toward a housing inlet through which the baled insulation material advances toward the cutters, with the rotary impactors projecting similarly but to a lesser extent toward the inlet so that the baled material is cut into segments before it is severed by the impactors.

Another object of the invention includes the provision of means for alternately pushing against the forward end portion of the advancing bale to displace it transversely and generally opposite to the transverse direction of bale displacement effected by the cutters, and releasing the bale forward end portion, whereby the forward end portion of the bale oscillates transversely as it advances downwardly in the cutting zone.

These and other objects and advantages of the invention, as well as the details of an illustrative embodiment, will be more fully understood from the following detailed description of the drawings, in which:

FIG. 1 is a view taken in vertical section through the apparatus; and

FIG. 2 is a section taken on line 2—2 of FIG. 1.

The apparatus shown in FIGS. 1 and 2 is intended to be mounted on a device for feeding cut, severed and shredded insulation material to a conduit through which a stream of air is delivered by a blower.

Guide hopper 100 for the bale 101 extends vertically and has a rectangular cross section as seen in FIG. 2. The bale is fed into hopper 100 from a storage hopper 102 extending at an upward angle away from a side opening 103 in hopper 100. Supporting the latter is a downwardly tapering housing 104 having an inlet or mouth 105 through which the bale gravitates downwardly.

Directly below the inlet are the rotary cutters or saw blades 106 extending in vertical planes and mounted at horizontally spaced intervals on the three parallel, horizontally spaced shafts 107—109. The ends of these shafts project from the housing as seen in FIG. 2 and mount sprockets 110 which are interconnected by chains 111 for driving all the shafts and cutters in the same clockwise angular direction, as viewed in FIG. 1. Consequently, the lower end portion of the bale is continuously urged by the rotating cutters in the rightward horizontal direction indicated by the arrow 112, which is parallel to the planes of cutters 106.

The lower end portion of the bale is interruptedly displaced in an opposite or leftward horizontal direction as indicated by the arrow 113 by the oscillating mechanism generally indicated at 114. The latter includes a vertically elongated baffle 115 which is curved in horizontal cross section, having lesser curvature than the bale, and which presents its concave side to the bale. The baffle is mounted on a frame 116 to which one end of a link 117 is pivotally connected at 118, the opposite end of the link being pivotally connected to a drive wheel 119 at the eccentric location 120.

The wheel 119 is mounted on an axle 121 supported for rotation at 122 and 123 and driven by a sprocket 124 meshing with the drive chain 125, which also drives shaft 108 through a sprocket 126. The frame 116 for baffle 115 is, on the other hand, hung from hopper 100 at pivot locations 127. Therefore, rotation of the wheel 119 moves the link 117 back and forth within an opening 128 in hopper 100, so that the baffle 115 is angularly oscillated about the axis of pivot 127. Thus, the baffle 115 alternately pushes leftwardly against the lower portion of the bale and then allows the bale to move rightwardly under the influence of the cutters 126.

As a result of this motion, downward feeding and cutting of the bale proceeds most efficiently and at no time does the bale ever become stuck in the hopper 100.

Also, the baffle 115 tends to center or cradle the bale between the hopper opposite sides designated at 130, as the baffle moves back and forth in the hopper. Thus, while the bale is guided downwardly in the hopper, its contact with transversely moving guide structure, namely the baffle 115 is such that frictional resistance to downward gravitation of the bale is minimized.

The impactors or knockers for severing the cut strips of baled insulation material are shown mounted on shafts 107—109 at 132.

It will be understood that the rotary cutters and impactors 132 may be driven by hand or by machine, and the oscillating mechanism may be driven independently.

The downwardly tapering housing 104 contains a shredder 49 which rotates to prevent briding of the loose insulation material across the housing interior zone 76 by positively displacing the material downwardly to the rotary feeder 60, the material being loosely compacted during such displacement. The downward taper of housing 104 acts to concentrate the material as it flows downwardly away from the cutting zone, this action being in addition to the downward concentrating action of the shredder 49.

Mounted within the drum housing is a shaft 56 extending horizontally. Shaft 56 carries at least seven paddles or plates 57, extending in radial and axial planes equally spaced about the shaft axis, the paddles mounting flexible seals 58 engageable with the interior walls of the drum housing during rotation of shaft 56 to seal off the individual compartments formed by the paddles and seals. The insulation material falls into these compartments during operation of the apparatus so that material is carried in batches in a circular path as indicated by the arrows 59. Thus a continuous downward flow of the material is maintained, overcoming the tendency of the material to resist flowing, and the material is air entrained for delivery through air conduit 16.

I claim:

1. Apparatus for processing a bulky body of fibrous insulation material adapting the material for gas stream entrainment, comprising means for receiving the body to advance forwardly and endwise downwardly and forming a cutting zone into which the body progressively advances, cutters movable in said zone for cutting the material into segments at the forward end portion of said body advancing downwardly within said zone and for continuously urging the forward portion of the advancing body in a first direction transverse to the direction of body advancement, means for alternately pushing against the forward end portion of the advancing body to displace said forward end portion in a second transverse direction generally opposite to said first transverse direction and releasing the forward end portion of the body to allow said forward end portion to travel in said first transverse direction, whereby the forward end portion of said body oscillates tranversely as it advances downwardly into said cutting zone, and means for severing the advancing segment of material within said cutting zone and for discharging the severed material from said zone and away from the forward end portion of said body.

2. The invention as defined in claim 1 including means for downwardly concentrating the discharged material and including a downwardly tapering zone directly beneath said cutting zone and a rotary device in said tapered zone acting to downwardly displace material received therein.

References Cited in the file of this patent
UNITED STATES PATENTS

| | | |
|---|---|---|
| 537,764 | Gillet | Apr. 16, 1890 |
| 1,090,120 | Scott | Mar. 10, 1914 |
| 1,844,279 | Gossard | Feb. 9, 1932 |
| 2,084,764 | Constantin | June 22, 1937 |
| 2,355,358 | Anderson | Aug. 8, 1944 |
| 2,439,014 | Luhrmann | Apr. 6, 1948 |
| 2,858,080 | Couchot | Oct. 28, 1958 |
| 2,889,862 | Williamson | June 9, 1959 |
| 2,903,193 | Anderson | Sept. 8, 1959 |

FOREIGN PATENTS

| | | |
|---|---|---|
| 13,159 | Great Britain | of 1911 |
| 307,548 | Germany | Sept. 5, 1918 |
| 887,126 | Germany | Aug. 20, 1953 |
| 437,242 | Great Britain | Oct. 25, 1935 |